(12) United States Patent
Tanaka et al.

(10) Patent No.: US 9,705,366 B2
(45) Date of Patent: Jul. 11, 2017

(54) EMBEDDED PERMANENT MAGNET ROTARY ELECTRIC MACHINE

(71) Applicant: MITSUBISHI ELECTRIC CORPORATION, Chiyoda-ku (JP)

(72) Inventors: Toshinori Tanaka, Chiyoda-ku (JP); Eigo Totoki, Chiyoda-ku (JP); Ryuichi Takiguchi, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/126,503

(22) PCT Filed: Feb. 24, 2015

(86) PCT No.: PCT/JP2015/055213
§ 371 (c)(1),
(2) Date: Sep. 15, 2016

(87) PCT Pub. No.: WO2015/156044
PCT Pub. Date: Oct. 15, 2015

(65) Prior Publication Data
US 2017/0085143 A1 Mar. 23, 2017

(30) Foreign Application Priority Data
Apr. 8, 2014 (JP) .................................. 2014-079387

(51) Int. Cl.
*H02K 21/12* (2006.01)
*H02K 1/27* (2006.01)
*H02K 1/14* (2006.01)

(52) U.S. Cl.
CPC ........... *H02K 1/2706* (2013.01); *H02K 1/146* (2013.01); *H02K 1/276* (2013.01)

(58) Field of Classification Search
CPC ............................ H02K 1/276; H02K 1/2766
(Continued)

(56) References Cited

U.S. PATENT DOCUMENTS 6,936,945 B2 * 8/2005 Murakami ............. H02K 1/276
310/154.11
8,405,269 B2 * 3/2013 Spaggiari ............... H02K 1/276
310/156.45
(Continued)

FOREIGN PATENT DOCUMENTS

JP 5-304737 A 11/1993
JP 2000-308287 A 11/2000
(Continued)

OTHER PUBLICATIONS

International Search Report issued May 12, 2015 in PCT/JP2015/055213 filed Feb. 24, 2015.

*Primary Examiner* — Hanh Nguyen
(74) *Attorney, Agent, or Firm* — Oblon, McClelland, Maier & Neustadt, L.L.P.

(57) ABSTRACT

R1>R2>R3 is satisfied, where R1 is a radius of curvature of a cylindrical surface that contacts circular arc-shaped curved surfaces arranged circumferentially, R2 is a radius of curvature of the circular arc-shaped curved surfaces, and R3 is a radius of curvature of an upper surface of permanent magnets, air gaps are formed on radially outer portions of two circumferential side portions of magnet housing apertures, surfaces that contact two circumferential side surfaces of the permanent magnets so as to be parallel to a radial direction are disposed on radially inner portions of the two circumferential end portions, and B2>B1 is satisfied, where B1 is a thickness of a core portion of the rotor core between the circular arc-shaped curved surfaces and the magnet housing apertures at a magnetic pole center, and B2 is a thickness of a circumferential end portion of the core portion.

20 Claims, 13 Drawing Sheets

(58) Field of Classification Search
USPC .......................... 310/156.44, 156.45, 156.46
See application file for complete search history.

(56) References Cited

U.S. PATENT DOCUMENTS

| | | | |
|---|---|---|---|
| 2006/0131976 A1* | 6/2006 | Kikuchi | H02K 1/276 310/156.46 |
| 2008/0203842 A1 | 8/2008 | Yoshikawa et al. | |
| 2011/0050022 A1* | 3/2011 | Li | H02K 1/276 310/156.46 |

FOREIGN PATENT DOCUMENTS

| | | |
|---|---|---|
| JP | 2000-333391 A | 11/2000 |
| JP | 2001-178037 A | 6/2001 |
| JP | 2002-84690 A | 3/2002 |
| JP | 2008-271652 A | 11/2008 |
| JP | 2009-100530 A | 5/2009 |
| JP | 2011-166927 A | 8/2011 |

\* cited by examiner

COMPARATIVE EXAMPLE

SKEW ANGLE

EMBEDDED PERMANENT MAGNET ROTARY ELECTRIC MACHINE

TECHNICAL FIELD

The present invention relates to an embedded permanent magnet rotary electric machine that includes a rotor in which permanent magnets are embedded in a rotor core.

BACKGROUND ART

In rotary electric machines such as industrial and vehicular motors, there is demand for reductions in size, increases in speed, and a widening of service speed ranges. Various embedded permanent magnet rotary electric machines that include a rotor in which permanent magnets are embedded in a rotor core have been proposed as rotary electric machines to meet these demands (see Patent Literature 1 and 2, for example).

CITATION LIST

Patent Literature

Patent Literature 1: Japanese Patent Laid-Open No. 2001-178037 (Gazette)
Patent Literature 2: Japanese Patent Laid-Open No. HEI 5-304737 (Gazette)

SUMMARY OF THE INVENTION

Problem to be Solved by the Invention

In a conventional embedded permanent magnet rotary electric machine according to Patent Literature 1, because an outer circumferential surface of a rotor core is a cylindrical surface, many harmonics are present in the magnetomotive force waveforms that are generated by the rotor, and one problem has been that cogging torque and torque ripples arise. Because the outer circumferential surface of the rotor core is a cylindrical surface, the core portion of the rotor core that is subjected to q-axis magnetic flux is in close proximity to a stator, increasing q-axis inductance. Thus, voltage saturation is more likely to occur during high-speed rotation, and another problem has been that the operating range cannot be widened. In addition, because internal shapes of magnet housing apertures and external shapes of the magnets are similar shapes, from the viewpoint of dimensional tolerances, the internal shapes of the magnet housing apertures are larger than the external shapes of the magnets, and another problem has been that gaps are more likely to arise between radially inner end portions on two circumferential side portions of the magnets and the magnet housing apertures in particular. Furthermore, because the two circumferential side portions of the permanent magnets are flat surfaces that are inclined relative to a magnetic pole center, the thicknesses of the two circumferential side portions of the permanent magnets are thinner parallel to the magnetic pole center. Operating points of the two side portions of the permanent magnets are thereby lower than an operating point of a central portion of the permanent magnets, and another problem has been that demagnetization of the magnets is more likely to occur.

In a conventional embedded permanent magnet rotary electric machine according to Patent Literature 2, an outer circumferential surface of the rotor core that forms magnetic poles is configured into a shape in which two ellipses are superimposed so as to be perpendicular to each other to reduce harmonics that are present in the magnetomotive force waveform that is generated by the rotor. However, in the conventional embedded permanent magnet rotary electric machines according to Patent Literature 2, because internal shapes of magnet housing apertures and external shapes of the magnets are also similar shapes, one problem has also been that gaps are more likely to arise between radially inner end portions on two circumferential side portions of the magnets and the magnet housing apertures. Furthermore, because the two circumferential side portions of the permanent magnets are flat surfaces that are inclined relative to the magnetic pole center, the thicknesses of the two circumferential side portions of the permanent magnets are thinner parallel to the magnetic pole center. Operating points of the two side portions of the permanent magnets are thereby lower than an operating point of a central portion of the permanent magnets, and one problem has been that demagnetization of the magnets is more likely to occur.

The present invention aims to solve the above problems and an object of the present invention is to provide an embedded permanent magnet rotary electric machine that can reduce cogging torque and torque ripples, that can expand an operating range, that can fix magnets without disposing clearances in a rotor core, and that can also suppress demagnetization of the magnets.

Means for Solving the Problem

An embedded permanent magnet rotary electric machine according to the present invention includes: an annular stator; and a rotor that is disposed coaxially inside the stator so as to have an air gap interposed. The rotor includes: a rotor core that has an external shape in which a plurality of circular arc-shaped curved surfaces that are convex radially outward are arranged circumferentially, and in which magnet housing apertures are formed so as to pass axially through an inner radial side of each of the circular arc-shaped curved surfaces; a rotating shaft that is inserted into a central axial position of the rotor core, and that holds the rotor core; and permanent magnets that are each produced into a rod-shaped body in which a radially outer side of a cross section that is perpendicular to a longitudinal direction is a circular arc that is convex radially outward, and in which two circumferential side surfaces are flat surfaces that are parallel to a plane that includes a magnetic pole center, the permanent magnets being housed in each of the magnet housing apertures. $R1>R2>R3$ is satisfied, where $R1$ is a radius of curvature of a cylindrical surface that contacts the circular arc-shaped curved surfaces that are arranged circumferentially, $R2$ is a radius of curvature of the circular arc-shaped curved surfaces, and $R3$ is a radius of curvature of an upper surface of the permanent magnets, the magnet housing apertures include air gap portions that are formed by expanding radially outer portions of two circumferential side portions circumferentially outward, surfaces that contact the two circumferential side surfaces of the permanent magnets so as to be parallel to a radial direction are disposed on radially inner portions of the two circumferential side portions of the magnet housing apertures, and $B2>B1$ is satisfied, where $B1$ is a thickness of a core portion of the rotor core between the circular arc-shaped curved surfaces and the magnet housing apertures at the magnetic pole center, and $B2$ is a thickness of a circumferential end portion of the core portion.

Effects of the Invention

According to the present invention, the rotor core is formed so as to have an external shape that is configured by arranging circumferentially a plurality of circular arc-shaped curved surfaces 13 that are convex radially outward. Thus, harmonics that are present in the magnetomotive force waveform that is generated by the rotor are reduced, enabling the generation of cogging torque and torque ripples to be suppressed. Because the portions of the rotor core that are subjected to q-axis magnetic flux are separated from the stator, q-axis inductance is reduced. Thus, voltage saturation is less likely to occur during high-speed rotation, enabling the operating range to be expanded.

Because R1>R2>R3 is satisfied, where R1 is a radius of curvature of a cylindrical surface, R2 is a radius of curvature of the circular arc-shaped curved surfaces, and R3 is a radius of curvature of an upper surface of the permanent magnets, the thicknesses of the core portions of the rotor core on a radially outer side of the permanent magnets become gradually thicker away from the magnetic pole centers. Thus, the core portions radially outside the permanent magnets at the magnetic pole centers easily become magnetically saturated, reducing the amount of magnetic leakage flux in the magnet magnetic flux, thereby enabling increased output to be achieved. In addition, because the amount of magnetic flux that reaches the air gap from the permanent magnets gradually reduces away from the magnetic pole centers, the harmonic magnetic flux density component in the air gap magnetic flux density component is reduced, enabling generation of cogging torque and torque ripples to be suppressed.

Because the magnet housing apertures have air gap portions that are formed by expanding radially outer portions of two circumferential side portions circumferentially outward, irregularities in the permanent magnets are absorbed by the air gap portions when the permanent magnets are housed in the magnet housing apertures. In addition, surfaces that are parallel to the two circumferential side surfaces of the permanent magnets and the radial direction, that are formed on radially inner portions of the two circumferential side portions of the magnet housing apertures, contact the two circumferential side surfaces of the permanent magnets. The permanent magnets can thereby be fixed to the rotor core without disposing clearances.

Because B2>B1 is satisfied, where B1 is a thickness of a core portion of the rotor core between the circular arc-shaped curved surfaces and the magnet housing apertures at a magnetic pole center, and B2 is a thickness of a circumferential end portion of the core portion, q-axis magnetic flux is less likely to flow through the core portion. Thus, q-axis inductance is reduced in the rotor, enabling the operating range to be expanded.

Because the two circumferential side portions of the permanent magnets are formed into flat surfaces that are inclined relative to the magnetic pole centers, the thickness of the two circumferential side portions of the permanent magnets in a direction that is parallel to the magnetic pole centers becomes thicker, raising the operating points of the two side portions of the permanent magnets, and enabling demagnetization of the permanent magnets to be suppressed. In addition, because the thickness in the regions of the rotor core that are positioned radially outside the permanent magnets gradually becomes thicker toward the two side portions from a circumferentially central portion, magnetic flux from the stator is less likely to pass through the two side portions of the permanent magnets, enabling demagnetization of the permanent magnets to be suppressed.

DESCRIPTION OF EMBODIMENTS

Preferred embodiments of an embedded permanent magnet rotary electric machine according to the present invention will now be explained with reference to the drawings.

Embodiment 1

Figure 1:
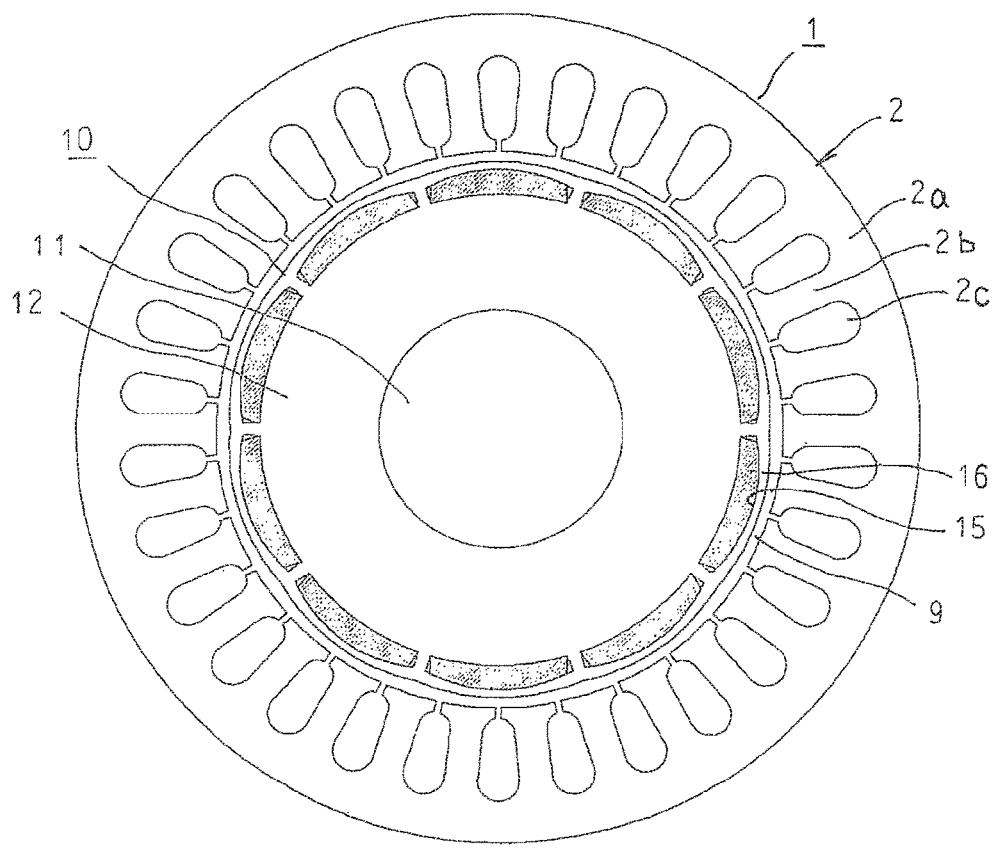
FIG. 1 is a cross section that shows an embedded permanent magnet rotary electric machine according to Embodiment 1 of the present invention.
Figure 2:
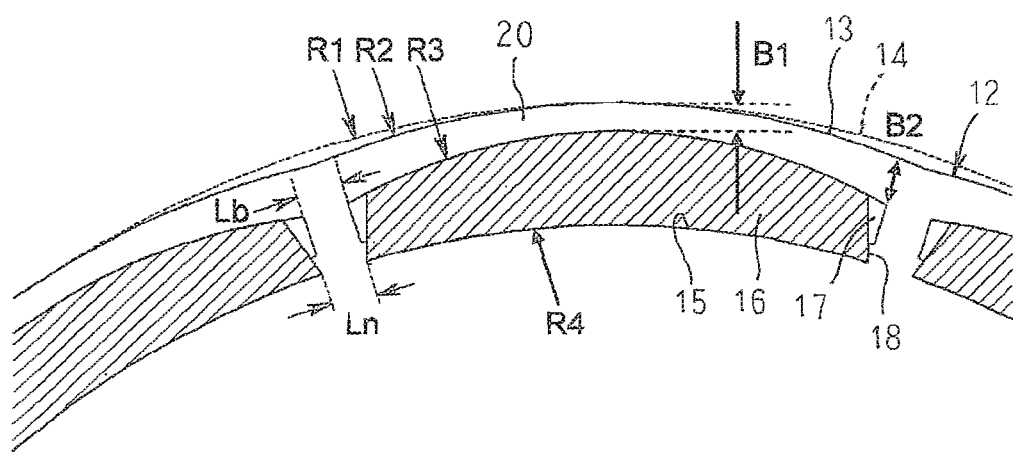
FIG. 2 is a partial enlargement that shows a vicinity of a permanent magnet of a rotor in the embedded permanent magnet rotary electric machine according to Embodiment 1 of the present invention.
Figure 3:
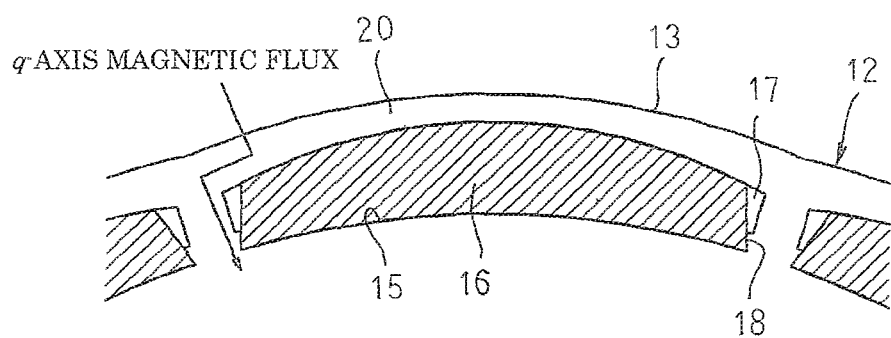
FIG. 3 is a schematic diagram that explains flow of q-axis magnetic flux in a rotor of the embedded permanent magnet rotary electric machine according to Embodiment 1 of the present invention.
Figure 4:
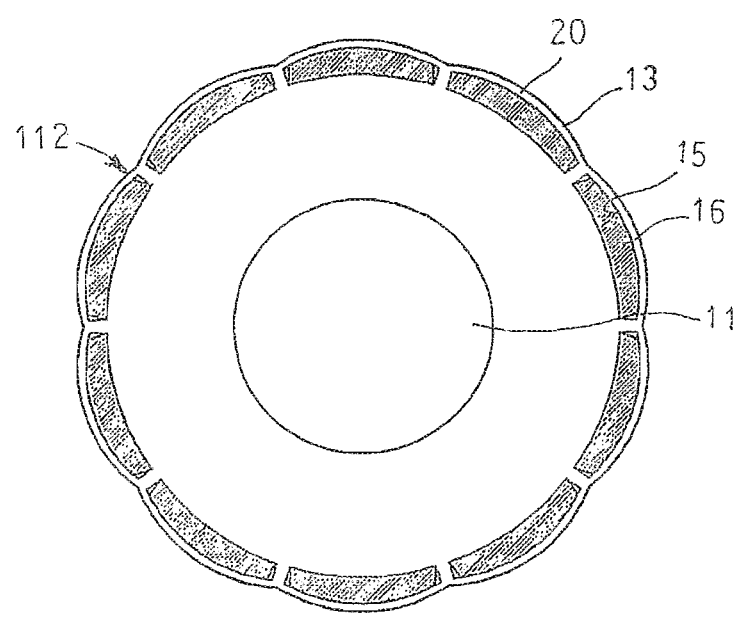
FIG. 4 is a cross section that shows a rotor in a comparative embedded permanent magnet rotary electric machine.
Figure 5:
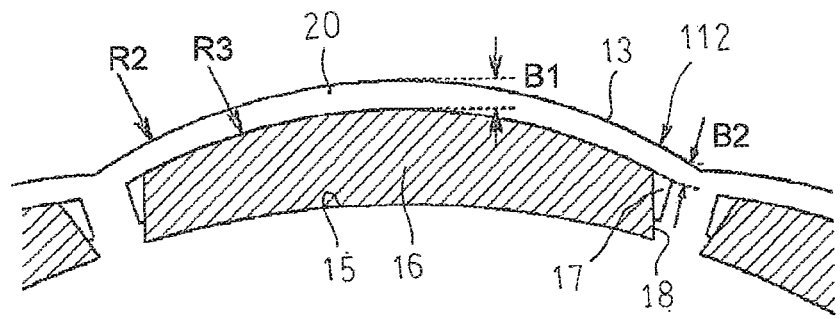
FIG. 5 is a partial enlargement that shows a vicinity of a permanent magnet of a rotor core in the comparative embedded permanent magnet rotary electric machine.
Figure 6:
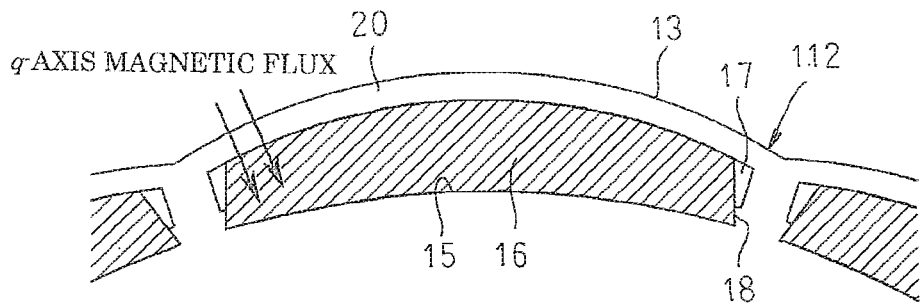
FIG. 6 is a schematic diagram that explains flow of q-axis magnetic flux in the rotor of the comparative embedded permanent magnet rotary electric machine.
Figure 7:
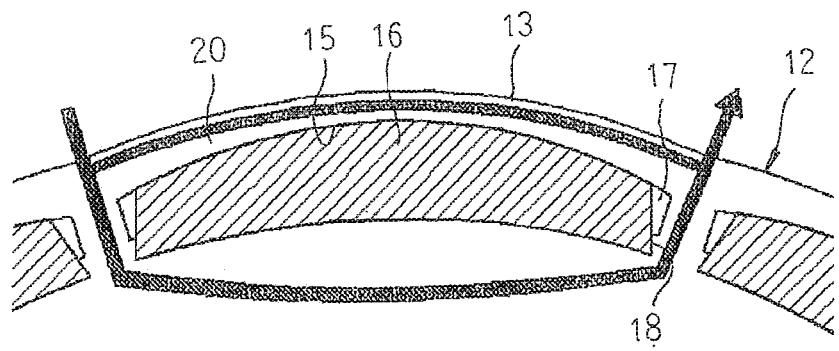
FIG. 7 is a schematic diagram that shows pathways of q-axis magnetic flux in the rotor of the embedded permanent magnet rotary electric machine according to Embodiment 1 of the present invention.
Figure 8:
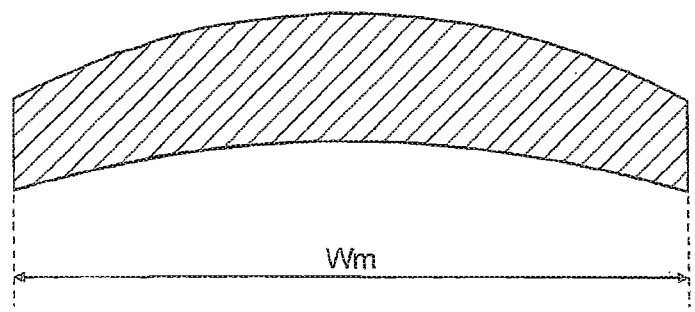
FIG. 8 is a cross section that shows the permanent magnet in the embedded permanent magnet rotary electric machine according to Embodiment 1 of the present invention.
Figure 9:
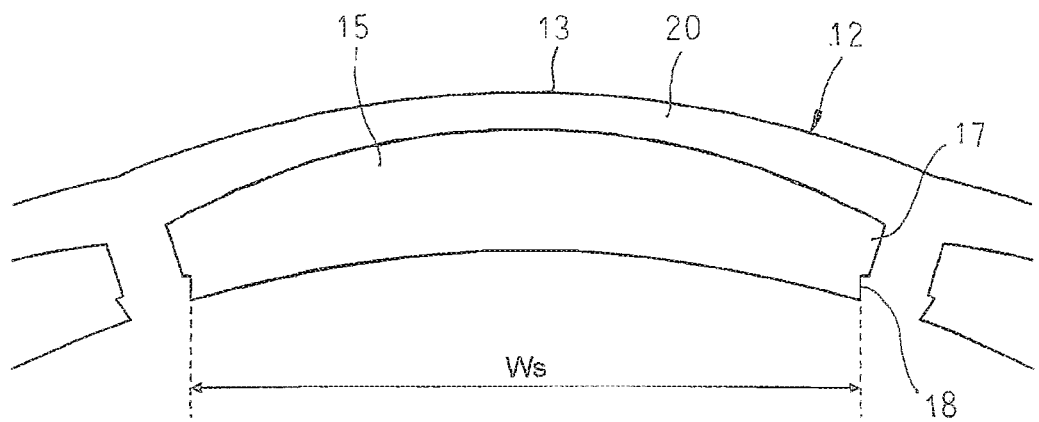
FIG. 9 is a partial enlargement that shows a vicinity of a magnet insertion aperture of a rotor core in the embedded permanent magnet rotary electric machine according to Embodiment 1 of the present invention.

FIG. 1 is a cross section that shows an embedded permanent magnet rotary electric machine according to Embodiment 1 of the present invention, FIG. 2 is a partial enlargement that shows a vicinity of a permanent magnet of a rotor in the embedded permanent magnet rotary electric machine according to Embodiment 1 of the present invention, FIG. 3 is a schematic diagram that explains flow of q-axis magnetic flux in a rotor of the embedded permanent magnet rotary electric machine according to Embodiment 1 of the present invention, FIG. 4 is a cross section that shows a rotor in a comparative embedded permanent magnet rotary electric machine, FIG. 5 is a partial enlargement that shows a vicinity of a permanent magnet of a rotor core in the comparative embedded permanent magnet rotary electric machine, FIG. 6 is a schematic diagram that explains flow of q-axis magnetic flux in the rotor of the comparative embedded permanent magnet rotary electric machine, FIG. 7 is a schematic diagram that shows pathways of q-axis magnetic flux in the rotor of the embedded permanent magnet rotary electric machine according to Embodiment 1 of the present invention, FIG. 8 is a cross section that shows the permanent magnet in the embedded permanent magnet rotary electric machine according to Embodiment 1 of the present invention, and FIG. 9 is a partial enlargement that shows a vicinity of a magnet insertion aperture of a rotor core in the embedded permanent magnet rotary electric machine according to Embodiment 1 of the present invention.

In FIG. 1, an embedded permanent magnet rotary electric machine 100 includes: an annular stator 1; and a rotor 10 that is coaxially and rotatably disposed inside the stator 1 so as to have an air gap 9 interposed.

The stator 1 includes a stator core 2 that is produced by stacking and integrating electromagnetic steel sheets, and that is formed such that teeth 2b each protrude radially inward from an inner wall surface of an annular back yoke 2a so as to be arranged at a uniform angular pitch circumferentially. In this case, thirty slots 2c that are formed by the back yoke 2a and adjacent teeth 2b are arranged circumferentially. Furthermore, although not shown, distributed winding stator windings are mounted to the stator core 2.

The rotor 10 includes: a rotor core 12 that is produced by stacking and integrating electromagnetic steel sheets, and that has an external shape in which a plurality of circular arc-shaped curved surfaces 13 are arranged at a uniform angular pitch circumferentially; a rotating shaft 11 that is inserted into and fixed to a central axial position of the rotor core 12; and permanent magnets 16 that are embedded into an outer circumferential side of the rotor core.

As shown in FIG. 2, the rotor core 12 is configured such that ten protruding portions that have a radius of curvature R2, that are formed by the circular arc-shaped curved surfaces 13, are arranged at a uniform angular pitch circumferentially. The ten circular arc-shaped curved surfaces 13 that are arranged circumferentially contact a cylindrical surface 14 that has a radius of curvature R1. Magnet housing apertures 15 are formed so as to pass axially through the rotor core 12 on an inner radial side of each of the circular arc-shaped curved surfaces 13.

As shown in FIGS. 2 and 8, the permanent magnets 16 are produced into rod-shaped bodies that have a length that is approximately equal to an axial length of the rotor core 12, and in which a cross-sectional shape that is perpendicular to a longitudinal direction is formed so as to have a circular arc shape that is surrounded by an upper side that is convex radially outward that has a radius of curvature R3, a lower side that is convex radially outward that has a radius of curvature R4, and a pair of flanking sides that are formed by parallel straight lines. The permanent magnets 16 are inserted into and fixed to the respective magnet housing apertures 15, and are arranged circumferentially such that polarities of surfaces (upper surfaces) on outer circumferential sides of the permanent magnets 16 line up alternately as a North-seeking (N) pole, a South-seeking (S) pole, an N pole, an S pole, etc. Moreover, Wm is a spacing between the pair of flanking sides of the permanent magnets 16, that is, a circumferential width.

As shown in FIGS. 2 and 9, the magnet housing apertures 15 are formed so as to have an aperture shape that is a similar shape to an external shape of the permanent magnets 16 except for having air gap portions 17 that are formed by expanding radially outer portions of two circumferential side portions circumferentially outward. Moreover, Ws is a spacing between magnet detent portions 18 (described below), that is, a circumferential width.

Here, in the cross section that is perpendicular to a central axis of the rotating shaft 11, the radius of curvature R1 of the cylindrical surface 14 is greater than the radius of curvature R4 of the lower surfaces of the permanent magnets 16, which is greater than the radius of curvature R2 of the circular arc-shaped curved surfaces 13, which is greater than the radius of curvature R3 of the upper surfaces of the permanent magnets 16. Moreover, radii of curvature of the upper surface and the lower surface of the inner wall surfaces of the magnet housing apertures 15 approximately match the radius of curvature R3 of the upper surfaces of the permanent magnets 16 and the radius of curvature R4 of the lower surfaces of the permanent magnets 16, respectively. The circular arc-shaped curved surfaces 13, the aperture shapes of the magnet housing apertures 15, and the external shapes of the permanent magnets 16 each have mirror symmetry that has a plane that passes through the central axis of the rotating shaft 11 and a circumferential center of the circular arc-shaped curved surfaces 13 as a plane of symmetry. This plane of symmetry is a magnetic pole center.

The core portions of the rotor core 12 on a radially outer side of the permanent magnets 16 constitute bridge portions 20. These bridge portions 20 are formed such that thickness becomes thicker circumferentially away from the magnetic pole centers. The thickness at the magnetic pole center of the bridge portions 20 is B1, and the thickness of the circumferential end portions is B2 (>B1).

Interpolar centers are planes that pass through the central axis of the rotating shaft 11 and centers between circumferentially adjacent magnet housing apertures 15 (permanent magnets 16). The facing wall surfaces of the air gap portions 17 of the circumferentially adjacent magnet housing apertures 15 are parallel to the interpolar centers. Radially inner portions of the two circumferential side portions of the magnet housing apertures 15, i.e., the radially inner portions of the air gap portions 17, are wall surfaces that are parallel to the magnetic pole centers, and form magnet detent portions 18. Lb is a distance between the circumferentially adjacent air gap portions 17, and Ln is a distance between the circumferentially adjacent magnet detent portions 18.

The embedded permanent magnet rotary electric machine 100 that is configured in this manner operates as a ten-pole thirty-slot rotary electric machine.

According to Embodiment 1, the outer circumferential surface of the rotor core 12 is configured such that ten circular arc-shaped curved surfaces 13 that have a radius of curvature R2 are arranged at a uniform angular pitch circumferentially. Thus, the harmonics that are present in the magnetomotive force waveform that is generated by the rotor 10 are reduced compared to Patent Literature 1, which uses a rotor that has a perfectly circular external shape, enabling the generation of cogging torque and torque ripples to be suppressed. Because the portions of the rotor core 12 that are subjected to q-axis magnetic flux are separated from the stator 1, q-axis inductance is reduced. Thus, voltage saturation is less likely to occur during high-speed rotation, enabling the operating range to be expanded.

Because the aperture shape of the magnet housing apertures 15 is formed so as to have a similar shape to the permanent magnets 16 except for having air gap portions 17 that are formed by expanding radially outer portions of two circumferential side portions circumferentially outward, dimensional irregularities in the permanent magnets 16 are absorbed by the air gap portions 17, when the permanent magnets 16 are housed in the magnet housing apertures 15. The magnet detent portions 18 that are constituted by the radially inner sides of the two circumferential side portions of the magnet housing apertures 15 contact the two circumferential side surfaces of the permanent magnets 16 so as to be parallel thereto in a radial direction, enabling the permanent magnets 16 to be fixed without disposing clearances in the rotor core 12. By fixing the permanent magnets 16 in this manner without disposing clearances in the rotor core 12, the magnet positions cease to be irregular. Thus, it becomes possible to suppress cogging torque and torque ripples that occur due to irregularities in magnet position.

Because the two circumferential side portions of the permanent magnets 16 are flat surfaces that are parallel to the magnetic pole centers, the operating points of the two side portions of the permanent magnets 16 are higher because the magnet thicknesses of the two side portions of the permanent magnets 16 in the direction that is parallel to the magnetic pole centers is thicker, suppressing demagnetization of the permanent magnets 16.

Because the air gap portions 17 are formed integrally in the two circumferential side portions of the magnet housing apertures 15, the width Lb of the interpolar core portions is narrower. Thus, magnetic leakage flux is reduced in the magnet magnetic flux due to magnetic saturation of the core portions in question, enabling output to be improved.

Figure 10:
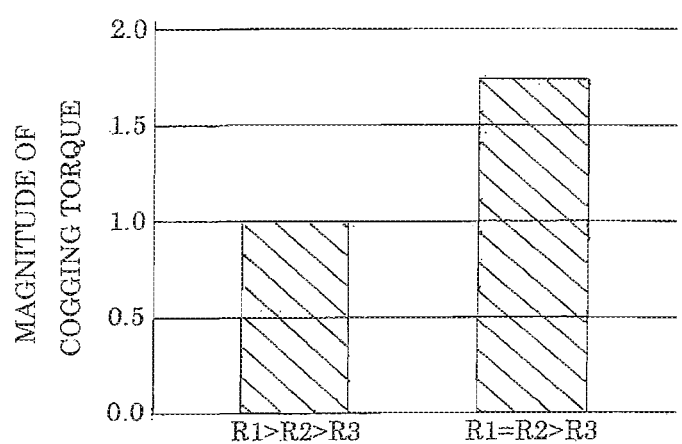
FIG. 10 is a graph that shows magnitude of cogging torque when an outer circumferential surface shape of the rotor core is modified in the embedded permanent magnet rotary electric machine according to Embodiment 1 of the present invention.

Now, a rotary electric machine in which a rotor core 12 was used that has an outer circumferential surface that is configured by arranging ten circular arc-shaped curved surfaces 13 that have a radius of curvature R2 at a uniform angular pitch circumferentially (R1>R2>R3) and a rotary electric machine in which a rotor core was used that has a perfect circle as an external shape (R1=R2>R3) were prepared, and cogging torque was measured, the results thereof being shown in FIG. 10. FIG. 10 is a graph that shows magnitude of cogging torque when an outer circumferential surface shape of the rotor core is modified in the embedded permanent magnet rotary electric machine according to Embodiment 1 of the present invention. Moreover, the rotor core that has a perfect circle as an external shape is configured in a similar manner to the rotor core 12 except that it has a cylindrical surface that contacts the circular arc-shaped curved surfaces 13 of the rotor core 12 as an outer circumferential surface. Furthermore, in FIG. 10, the magnitude of the cogging torque of the rotary electric machine that used a rotor core that has a perfect circle as an external shape (R1=R2>R1) is shown when the magnitude of the cogging torque of the rotary electric machine that used the rotor core 12 (R1>R2>R3) is one.

From FIG. 10, it was confirmed that cogging torque is significantly reduced when a rotor core 12 is used that has an outer circumferential surface that is configured by arranging circular arc-shaped curved surfaces 13 that have a radius of curvature R2 at a uniform angular pitch circumferentially compared to when a rotary electric machine in which a rotor core is used that has a perfect circle as an external shape (R1=R2>R3) were prepared, and cogging torque was measured, the results thereof being shown in FIG. 10. This cogging torque-reducing effect can be inferred to be due to the harmonics that are present in the magnetomotive force waveform that is generated by the rotor being reduced when a rotor core 12 that has an outer circumferential surface that is configured by arranging circular arc-shaped curved surfaces 13 that have a radius of curvature R2 at a uniform angular pitch circumferentially is used compared to when a rotor core that has a perfect circle as an external shape is used.

Next, effects due to the radius of curvature R3 of the outer circumferential surfaces of the permanent magnets 16 being smaller than the radius of curvature R2 of the circular arc-shaped curved surfaces 13 will be explained in contrast to a comparative example.

As shown in FIGS. 4 and 5, a rotor 110 in a comparative embedded permanent magnet rotary electric machine is configured in a similar manner to the rotor 10 in the present embedded permanent magnet rotary electric machine 100 except that the radius of curvature R1 of the cylindrical surface 14 of the rotor core 112 is greater than the radius of curvature R2 of the circular arc-shaped curved surfaces 13, which is equal to the radius of curvature R3 of the upper surfaces of the permanent magnets 16, in a cross section that is perpendicular to a central axis of the rotating shaft 11. Because the radius of curvature R2 of the circular arc-shaped curved surfaces 13 in the comparative rotor 110 is equal to the radius of curvature R3 of the upper surfaces of the permanent magnets 16, the thickness of the bridge portions 20 is uniform. In other words, the thickness B1 at the magnetic pole centers of the bridge portions 20 and the thickness B2 at the two circumferential end portions of the bridge portions 20 are equal.

In the comparative rotor 110, the mechanical strength of the bridge portions 20 is reduced if the thickness B2 of the two end portions of the bridge portions 20 is reduced, and there is a possibility that the bridge portions 20 may be damaged due to centrifugal forces that act on the permanent magnets 16 during high-speed rotation. The q-axis magnetic flux that the stator winding produces enters the two circumferential end portions of the bridge portions 20. Because the thickness B2 of the two end portions of the bridge portions 20 is thinner, the q-axis magnetic flux passes through the bridge portions 20, and flows through the permanent magnets 16 on a radially inner side, as indicated by the arrows in FIG. 6. Here, the q-axis magnetic flux flows through the permanent magnets 16 in an opposite direction to the direction of orientation of magnetization, and the permanent magnets 16 are subjected to a demagnetizing field, facilitating demagnetization of the permanent magnets 16.

Furthermore, in the comparative the rotor 110, the mechanical strength of the bridge portions 20 could be increased and demagnetization of the permanent magnets 16 by the q-axis magnetic flux could be suppressed by increasing the thickness B2 at the two end portions of the bridge portions 20. However, increasing the thickness B2 at the two end portions of the bridge portions 20 would increase the thickness B1 of the bridge portions 20 at the magnetic pole centers, increasing the magnetic leakage flux in the magnet magnetic flux. Thus, increases in torque due to the magnetic flux that is generated by the permanent magnets 16 would be suppressed, reducing output.

In the rotor 10 of the present embedded permanent magnet rotary electric machine 100, because the radius of curvature R3 of the outer circumferential surface of the permanent magnets 16 is smaller than the radius of curvature R2 of the circular arc-shaped curved surfaces 13, the thickness B1 of the bridge portions 20 at the magnetic pole centers is formed so as to be thinner than the thickness B2 at the two circumferential end portions. Thus, because magnetic leakage flux in the magnet magnetic flux is reduced by magnetic saturation at the magnetic pole centers of the bridge portions 20, torque due to the magnetic flux that is generated by the permanent magnets 16 is increased, enabling output to be improved. Furthermore, because the thickness B2 at the two circumferential end portions of the bridge portions 20 can be increased, the mechanical strength of the bridge portions 20 is high, enabling centrifugal force resistance to be increased. In addition, the thickness of the bridge portions 20 becomes thicker circumferentially away from the magnetic pole centers. Thus, the amount of magnetic flux that exits the permanent magnets 16 and reaches the air gap 9 decreases from the magnetic pole centers toward the interpolar sides. The harmonic magnetic flux density component in the air gap magnetic flux density component is reduced thereby, reducing cogging torque and torque ripples.

Because the thickness B2 at the two circumferential end portions of the bridge portions 20 is increased, the q-axis magnetic flux that the stator winding produces flows from the two circumferential end portions of the bridge portions 20 radially inward through interpolar core portions, as indicated by arrows in FIG. 3. Thus, the demagnetizing field that acts on the permanent magnets 16 due to the q-axis magnetic flux flowing through the permanent magnets 16 is reduced, suppressing demagnetization of the permanent magnets 16.

Because the radius of curvature R4 of the lower surface of the permanent magnets 16 is greater than the radius of curvature R3 of the upper surface of the permanent magnets 16, magnet volume is reduced away from the magnetic pole centers. Thus, the amount of magnetic flux that exits the permanent magnets 16 and reaches the air gap 9 decreases from the magnetic pole centers toward the sides. The harmonic magnetic flux density component in the air gap magnetic flux density component is reduced thereby, reducing the cogging torque and torque ripples.

Next, as indicated by the arrows in FIG. 7, the q-axis magnetic flux that has entered the rotor core 12 takes: a pathway in which it flows radially through the interpolar core portion, flows circumferentially through a core portion on the radially inner side of the permanent magnets 16, and flows radially outward through the neighboring interpolar core portion; and a pathway in which it flows circumferentially through the bridge portions 20.

The thickness B2 of the two end portions of the bridge portions 20 is determined by structural constraints. Thus, if an identical amount of magnet is used, the thicknesses B2 of the two end portions of the bridge portions 20 of the rotor 10 of the present embedded permanent magnet rotary electric machine 100 and the rotor 110 of the comparative embedded permanent magnet rotary electric machine are identical. In the present rotor 10, because B1 is less than B2, the q-axis magnetic flux is less likely to flow through the bridge portions 20 compared to the comparative rotor 110. Because of that, the q-axis inductance in the rotor 10 is less than in the comparative rotor 110.

Now, the voltage when the embedded permanent magnet rotary electric machine 100 operates as a motor is expressed by Expression (1). Here, V0 is the voltage, R is winding resistance of the stator winding, Lp is q-axis inductance, Ld is d-axis inductance, Iq is q-axis electric current, Id is d-axis electric current, and Φf is permanent magnet density.

[FORMULA 1]

$$V_0 = \sqrt{(R \cdot Id - \omega \cdot Lq \cdot Iq)^3 + (R \cdot Iq + \omega(Ld \cdot Id + \phi f))^2} \quad \text{Expression (1)}$$

It can be seen from Expression (1) that voltage V0 decreases as Lp decreases. This means that voltage saturation of the motor is superior. Because the q-axis inductance Lq is reduced, as mentioned above, it can be seen that the operating range of the present embedded permanent magnet rotary electric machine 100 can be expanded compared to the comparative embedded permanent magnet rotary electric machine.

There are also manufacturing constraints on Ln, B1, and B2, in addition to structural constraints. The rotor core 12 is formed by laminating and integrating electromagnetic steel sheets that have been punched out. If the sheet thickness of the electromagnetic steel sheets is t, then the width of Ln, B1, and B2 that can be produced by punching is a width that is greater than or equal to 0.4×t. Thus, if there are no problems with the structural strength, it is ideal to punch the electromagnetic steel sheets such that B1 is equal to 0.4×t. Magnetic leakage flux in the magnet magnetic flux can be reduced thereby, increasing torque due to the magnet magnetic flux, and enabling output to be improved.

However, if the electromagnetic steel sheets are punched such that B1 is equal to 0.4×t using a die, then it is necessary to punch in a plurality of increments so that the bridge portions 20 do not bend. Because of that, the die is larger, and punching machine time is increased, increasing costs. For this reason, it is desirable to make B1 greater than or equal to 1.4×t in order not to increase the size of the die, and to suppress increases in punching machine time. From the viewpoint of reducing the magnetic leakage flux in the magnet magnetic flux, it is particularly desirable to make B1 equal to 1.4×t.

Next, the aperture shape of the magnet housing apertures 15 and the external shape of the permanent magnets 16 will be investigated. Making the circumferential width Wm of the permanent magnets 16 equal to the circumferential width Ws between the magnet detent portions 18 of the magnet housing apertures 15 leads to increased magnet volume. The amount of magnetic flux that is generated by the permanent magnets 16 is increased thereby, enabling output to be improved.

Considering dimensional tolerances during manufacturing, it is desirable to set Ws so as to satisfy Wm+0.05 mm≤Ws≤Wm+0.1 mm. If Ws is set to equal Wm+0.1 mm in particular, then the circumferential width Wm of the permanent magnets 16 can be maximized.

In addition, if the distance Lb between the facing air gap portions 17 and the distance Ln between the facing magnet detent portions 18 are made equal, then the circumferential width Wm of the permanent magnets 16 can be maximized while ensuring the mechanical strength of the bridge portions 20, enabling output to be improved.

Moreover, in Embodiment 1 above, the stator winding is constituted by distributed windings, but the stator winding is not limited to distributed windings, and concentrated windings may be used.

In Embodiment 1 above, a ten-pole thirty-slot rotary electric machine has been explained, but the number of poles and the number of slots in the rotary electric machine are not limited thereto.

In Embodiment 1 above, the radius of curvature R4 of the lower surface of the permanent magnets is greater than the radius of curvature R3 of the upper surface, but the radius of curvature R4 of the lower surface of the permanent magnets may be less than or equal to the radius of curvature R3 of the upper surface.

Embodiment 2

Figure 11:
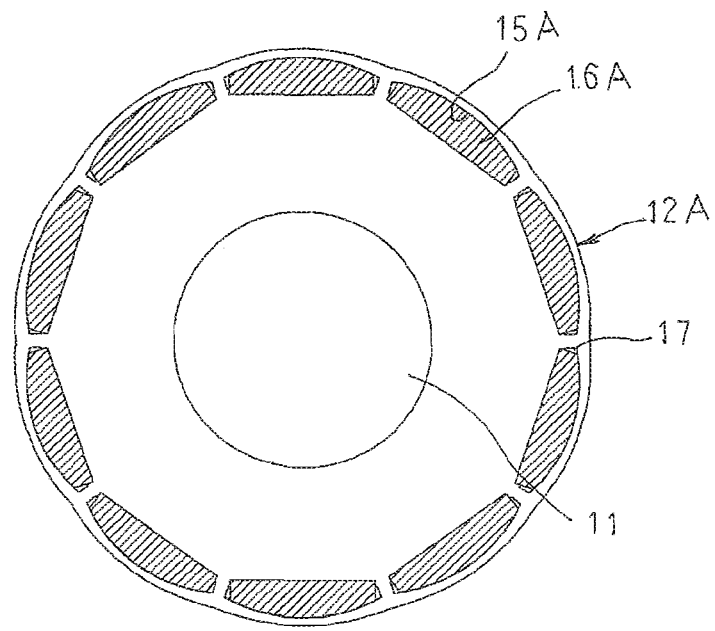
FIG. 11 is an end elevation that shows a rotor core in an embedded permanent magnet rotary electric machine according to Embodiment 2 of the present invention.
Figure 12:
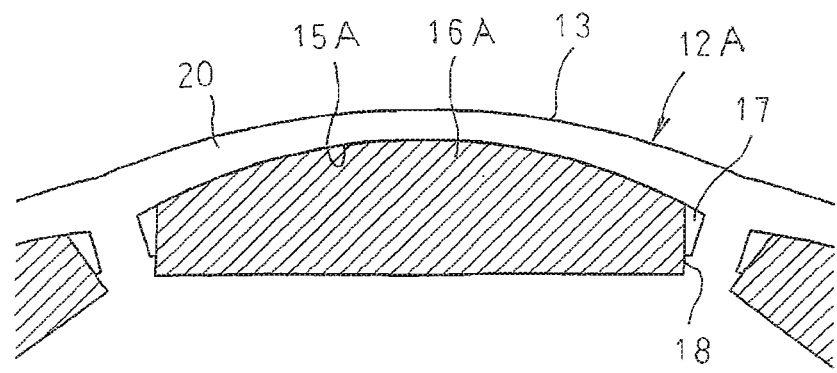
FIG. 12 is a partial enlargement that shows a vicinity of a permanent magnet of a rotor in the embedded permanent magnet rotary electric machine according to Embodiment 2 of the present invention.

FIG. 11 is an end elevation that shows a rotor core in an embedded permanent magnet rotary electric machine according to Embodiment 2 of the present invention, and FIG. 12 is a partial enlargement that shows a vicinity of a permanent magnet of a rotor in the embedded permanent magnet rotary electric machine according to Embodiment 2 of the present invention.

In FIGS. 11 and 12, a rotor 10A includes: a rotor core 12A that has an external shape in which a plurality of circular arc-shaped curved surfaces 13 are arranged at a uniform angular pitch circumferentially, and in which magnet housing apertures 15A are formed on an inner radial side of each of the circular arc-shaped curved surfaces 13; and permanent magnets 16A that are inserted into and fixed to each of the magnet housing apertures 15A.

The permanent magnets 16 are produced into rod-shaped bodies that have a length that is approximately equal to an axial length of the rotor core 12, and in which a cross-sectional shape that is perpendicular to a longitudinal direction is formed so as to have a semicylindrical shape that is surrounded by an upper side that has a radius of curvature R3, a lower side that is formed by straight line that is perpendicular to a direction of a radius that passes through a circumferential center of the upper side, and a pair of flanking sides that are formed by straight lines that are parallel to the direction of the radius that passes through the circumferential center of the upper side.

As shown in FIGS. 2 and 9, the magnet housing apertures 15A are formed so as to have an aperture shape that is a similar shape to an external shape of the permanent magnets 16A except for having air gap portions 17 that are formed by expanding radially outer portions of two circumferential side portions circumferentially outward.

Moreover, the rest of the configuration is formed in a similar or identical manner to that of Embodiment 1 above.

Consequently, similar or identical effects to those of Embodiment 1 above can also be achieved in Embodiment 2.

According to Embodiment 2, because the permanent magnets 16A are produced into rod-shaped bodies that have a semicylindrical cross section, machining of the permanent magnets 16A is facilitated compared to the permanent magnets 16 in which the upper and lower surfaces were formed into circular arc-shaped curved surfaces, enabling cost reductions to be achieved.

Because the lower surfaces of the permanent magnets 16A are formed into flat surfaces that are perpendicular to the magnetic pole centers, magnet volume is reduced away from the magnetic pole centers. Thus, the amount of magnetic flux that exits the permanent magnets 16A and reaches the air gap 9 decreases from the magnetic pole centers toward the interpolar sides. The harmonic magnetic flux density component in the air gap magnetic flux density component is reduced thereby, reducing the cogging torque and torque ripples.

Embodiment 3

Figure 13:
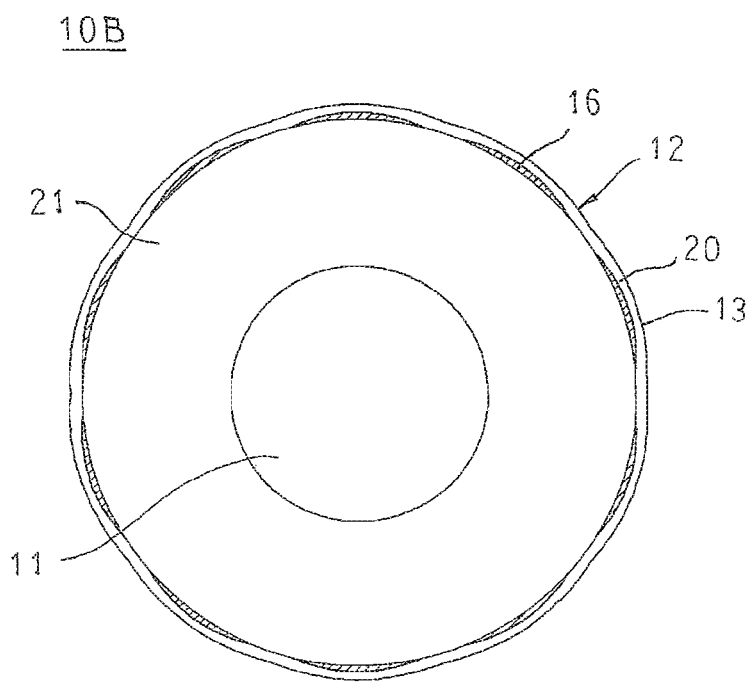
FIG. 13 is an end elevation that shows a rotor core in an embedded permanent magnet rotary electric machine according to Embodiment 3 of the present invention.
Figure 14:
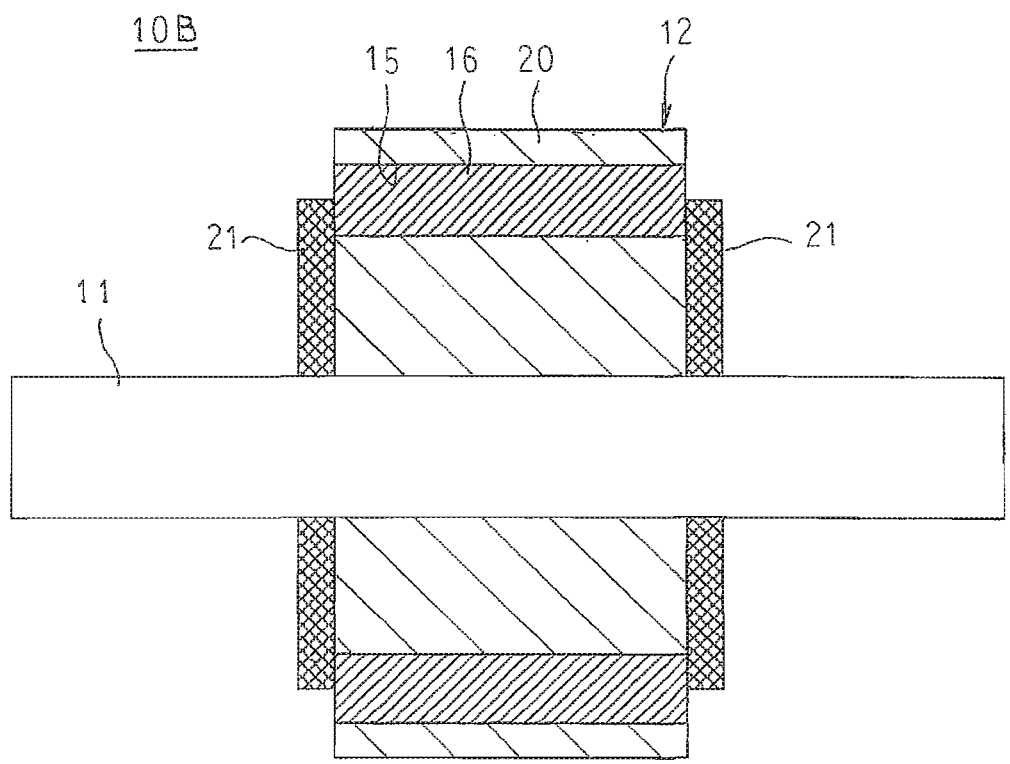
FIG. 14 is a cross section that shows the rotor core in the embedded permanent magnet rotary electric machine according to Embodiment 3 of the present invention.
Figure 15:
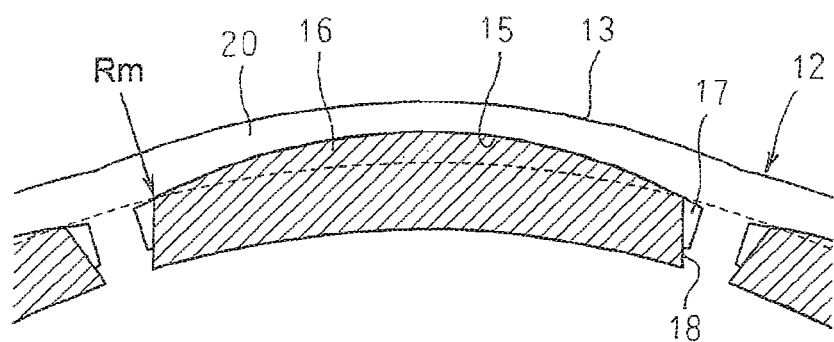
FIG. 15 is a partial enlargement that shows a vicinity of a permanent magnet of a rotor in the embedded permanent magnet rotary electric machine according to Embodiment 3 of the present invention.
Figure 16:
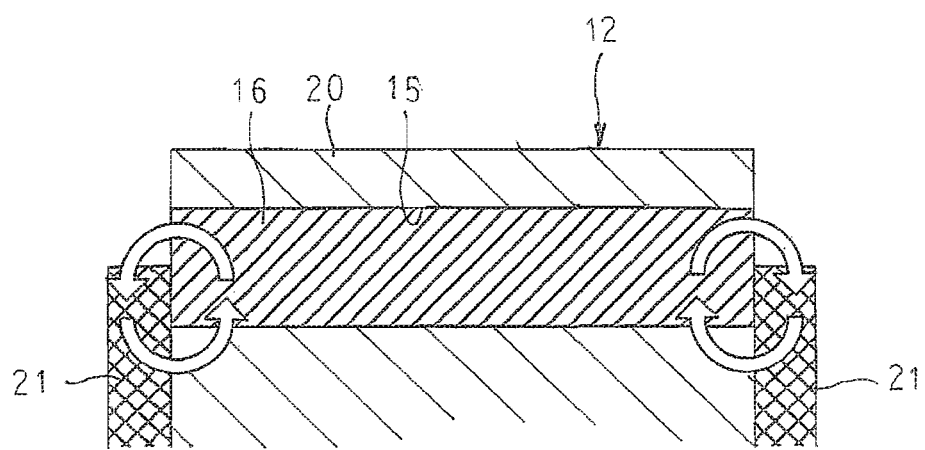
FIG. 16 is a diagram that explains flow of magnetic leakage flux in the rotor of the embedded permanent magnet rotary electric machine according to Embodiment 3 of the present invention.
Figure 17:
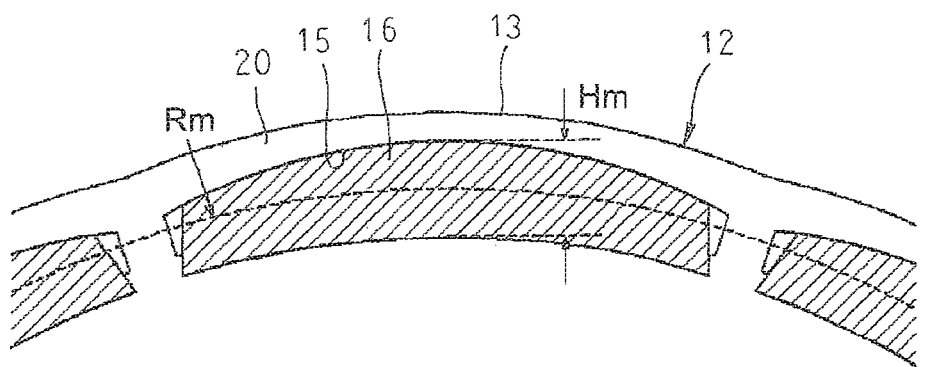
FIG. 17 is a partial enlargement that shows the vicinity of the permanent magnet of the rotor in the embedded permanent magnet rotary electric machine according to Embodiment 3 of the present invention.

FIG. 13 is an end elevation that shows a rotor core in an embedded permanent magnet rotary electric machine according to Embodiment 3 of the present invention, FIG. 14 is a cross section that shows the rotor core in the embedded permanent magnet rotary electric machine according to Embodiment 3 of the present invention, FIG. 15 is a partial enlargement that shows a vicinity of a permanent magnet of a rotor in the embedded permanent magnet rotary electric machine according to Embodiment 3 of the present invention, FIG. 16 is a diagram that explains flow of magnetic leakage flux in the rotor of the embedded permanent magnet rotary electric machine according to Embodiment 3 of the present invention, and FIG. 17 is a partial enlargement that shows the vicinity of the permanent magnet of the rotor in the embedded permanent magnet rotary electric machine according to Embodiment 3 of the present invention.

In FIGS. 13 through 15, a rotor 10B is fixed to a rotating shaft 11 by shrinkage fitting or press-fitting, etc., and includes end plates 21 that are disposed so as to contact two axial end surfaces of a rotor core 12. The end plates 21 are produced into ring-shaped flat plates that have a diameter Rm at which outer circumferential edges thereof are level with radial positions of points of intersection between upper surfaces and side surfaces of the permanent magnets 16.

Moreover, the rest of the configuration is formed in a similar or identical manner to that of Embodiment 1 above.

In Embodiment 3, because the rotor core 12, the magnet housing apertures 15, and the permanent magnets 16 are also configured in a similar or identical manner to those of Embodiment 1 above, similar effects to those in Embodiment 1 above can be achieved.

In Embodiment 3, the end plates 21 are fixed to the rotating shaft 11 so as to be in contact with the two axial end surfaces of the rotor core 12 so as to overlap with at least a portion of the permanent magnets 16 when viewed from an axial direction. Thus, even if there are electromagnetic imbalances, and thrust acts axially on the permanent magnets 16, axial movement of the permanent magnets 16 is prevented by the end plates 21. Consequently, axial dislodgment of the permanent magnets 16 from the rotor core 12 is reliably prevented.

Now, from a viewpoint of suppressing leakage of magnetic flux that emerges from the permanent magnets 16, it is desirable to produce the end plates 21 using a nonmagnetic material. However, if end plates 21 that are produced using a nonmagnetic material are fixed to the rotating shaft 11 by shrinkage fitting or press-fitting, etc., then there is a possibility that the joined portions between the end plates 21 and the rotating shaft 11 may loosen as the temperature of the rotor 10B increases due to differences in thermal expansion coefficient between the end plates 21 and the rotating shaft 11, and the end plates 21 may dislodge. If the interfitting tolerance is made too strict in order to prevent loosening of the joined portions between the end plates 21 and the rotating shaft 11, it becomes necessary to raise the shrinkage fitting temperature in the shrinkage fitting step, and insertion pressure rises in the press-fitting step, degrading workability. From the above, it is desirable for the end plates 21 to be produced using a magnetic material.

If the diameter Rm of end plates 21 that are produced using a magnetic material is equal to the outside diameter of the rotor core 12, then the entire end surface of the permanent magnets 16 is in contact with the end plates 21, increasing the magnetic leakage flux. Here, the area of the end surfaces of the permanent magnets 16 that contact the end plates 21 can be reduced by reducing the diameter Rm of the end plates 21. As indicated by the arrows in FIG. 16, the magnetic flux that emerges from the permanent magnets 16 thereby enters the end plates 21 from regions of the end surfaces of the permanent magnets 16 that contact the end plates 21, flows radially inward through the end plates 21, then enters a core portion of the rotor core 12 on the radially inner side of the permanent magnets 16, and flows through magnetic paths that return to the permanent magnets 16. Thus, because the flow of magnetic flux from the regions of the end surfaces of the permanent magnets 16 that are exposed from the end plates 21 toward the end plates 21 is suppressed, magnetic leakage flux can be reduced compared to when the outside diameter of the end plates 21 is made equal to the outside diameter of the rotor core 12. Thus, the smaller the area of the end plates 21 that contacts the end surface of the permanent magnets 16, the more magnetic leakage flux can be reduced.

Furthermore, if the end plates 21 cover even a portion of the permanent magnets 16 when viewed from an axial direction, they are effective in suppressing axial dislodgment of the permanent magnets 16. As shown in FIG. 17, in order to reliably stop axial dislodgment of the permanent magnets 16, it is sufficient if the end plates 21 cover a region that is greater than or equal to half of a thickness Hm of the permanent magnets 16 at the magnetic pole center when viewed from the axial direction.

From the above, it is desirable to set the outside diameter Rm such that the radial position of the outer circumferential edges of the end plates 21 is greater than or equal to a radial position of a point that is half of the thickness Hm of the permanent magnets 16 at the magnetic pole center, and is less than or equal to a radial position of a point of intersection between the upper surface and side surface of the permanent magnets 16, from viewpoints of reducing magnetic leakage flux and suppressing axial dislodgment of the permanent magnets 16.

Embodiment 4

Figure 18:
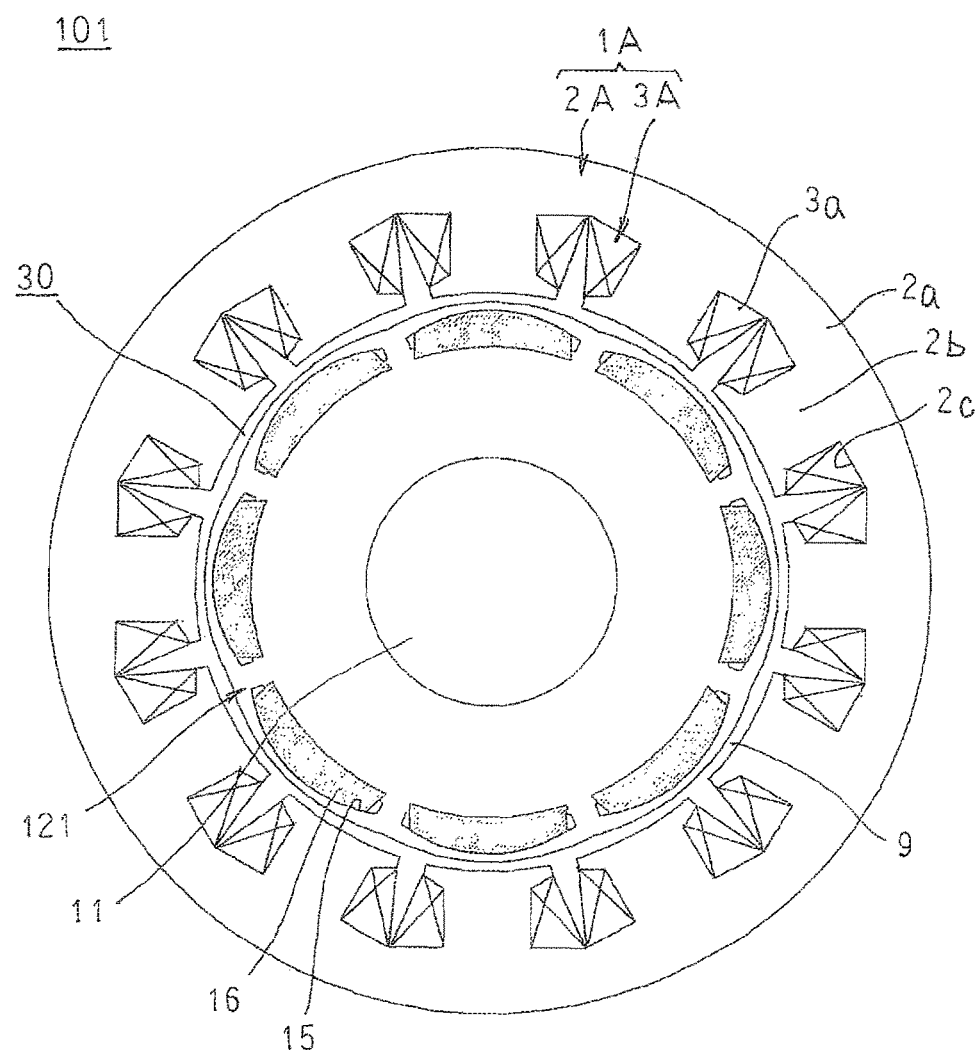
FIG. 18 is a cross section that shows an embedded permanent magnet rotary electric machine according to Embodiment 4 of the present invention.
Figure 19:
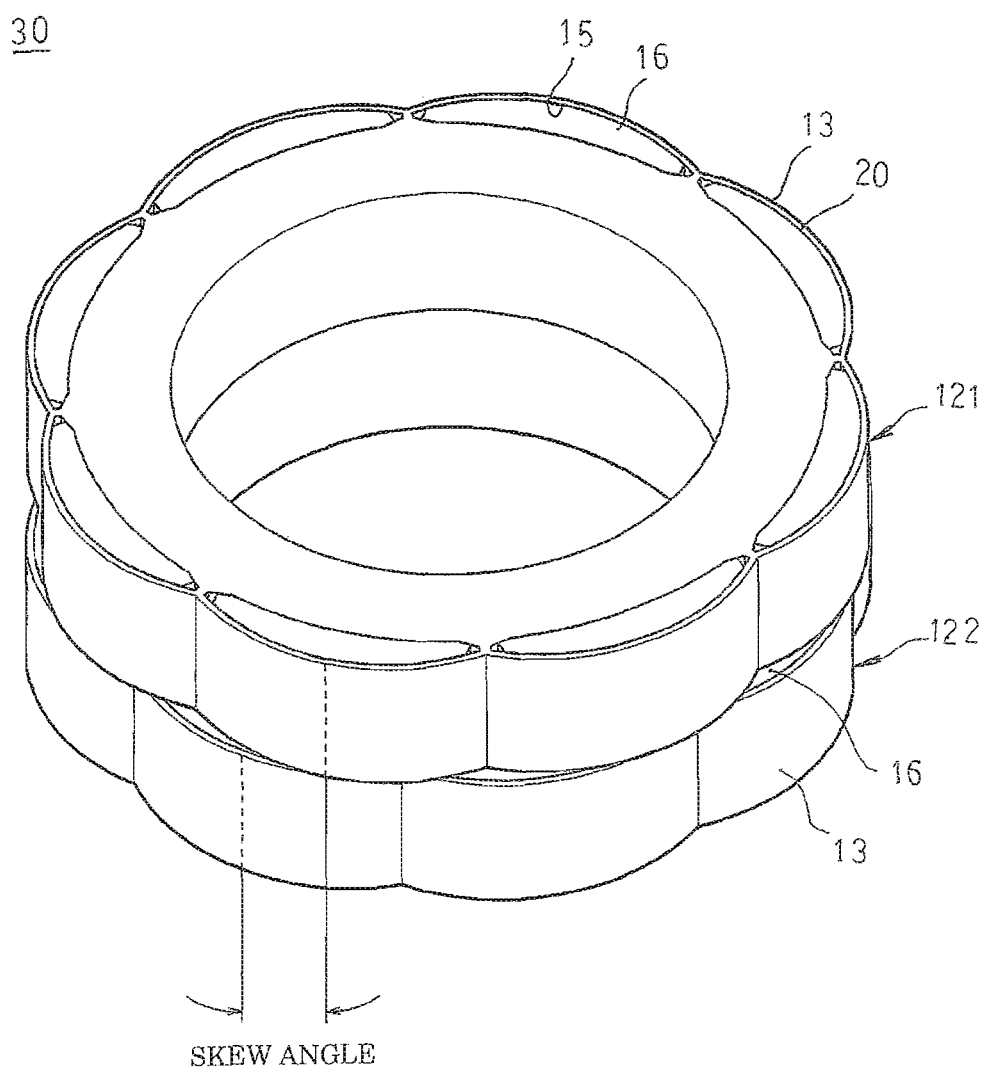
FIG. 19 is an oblique projection that shows a rotor core in the embedded permanent magnet rotary electric machine according to Embodiment 4 of the present invention.
Figure 20:
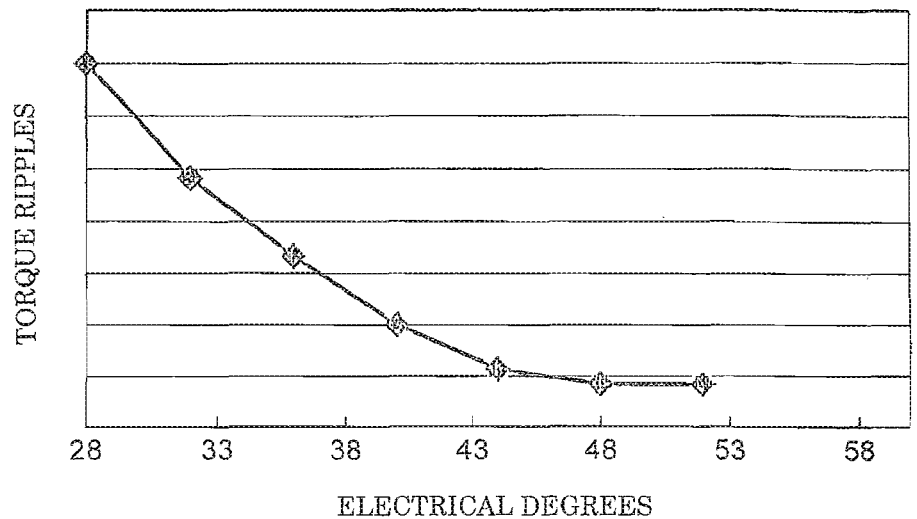
FIG. 20 is a graph that shows a relationship between torque ripples and step skew angle in the embedded permanent magnet rotary electric machine according to Embodiment 4 of the present invention.

FIG. 18 is a cross section that shows an embedded permanent magnet rotary electric machine according to Embodiment 4 of the present invention, FIG. 19 is an oblique projection that shows a rotor core in the embedded permanent magnet rotary electric machine according to Embodiment 4 of the present invention, and FIG. 20 is a graph that shows a relationship between torque ripples and step skew angle in the embedded permanent magnet rotary electric machine according to Embodiment 4 of the present invention.

In FIGS. 18 and 19, an embedded permanent magnet rotary electric machine 101 includes: an annular stator 1A; and a rotor 30 that is coaxially and rotatably disposed inside the stator 1A so as to have an air gap 9 interposed.

The stator 1A includes: a stator core 2A that is produced by stacking and integrating electromagnetic steel sheets, and that is formed such that teeth 2b each protrude radially inward from an inner wall surface of an annular back yoke 2a so as to be arranged at a uniform angular pitch circumferentially; and a stator winding 3 that is mounted to the stator core 2A. In this case, twelve slots 2c that are formed by the back yoke 2a and adjacent teeth 2b are arranged circumferentially. The stator winding 3 includes concentrated winding coils 3a that are produced by winding conductor wires onto each of the teeth 2b.

The rotor 30 includes: first and second rotor cores 121 and 122 that function as core segments that are produced by stacking and integrating electromagnetic steel sheets, the first and second rotor cores 121 and 122 having external shapes in which a plurality of circular arc-shaped curved surfaces 13 are arranged at a uniform angular pitch circumferentially and being disposed in an axial direction so as to be coaxial; a rotating shaft 11 that is inserted into and fixed to central axial positions of the first and second rotor cores 121 and 122; and permanent magnets 16 that are embedded into outer circumferential sides of the first and second rotor cores 121 and 122.

The first and second rotor cores 121 and 122 are each configured such that eight protruding portions that have a radius of curvature R2, that are formed by the circular arc-shaped curved surfaces 13, are arranged at a uniform angular pitch circumferentially. Magnet housing apertures 15 are formed so as to pass axially through the first and second rotor cores 121 and 122 on an inner radial side of each of the circular arc-shaped curved surfaces 13. In addition, the permanent magnets 16 are inserted into and fixed to each of the magnet housing apertures 15.

The first and second rotor cores 121 and 122 are fixed to the rotating shaft 11 that is inserted into the central positions thereof so as to be arranged coaxially in contact with each other in the axial direction such that magnetic pole centers are offset in a circumferential direction. Moreover, the first and second rotor cores 121 and 122 are configured in a similar or identical manner to the rotor core 12 in Embodiment 1 above except that eight permanent magnets 16 are embedded, and the axial thickness is half. Furthermore, a step skew angle is a circumferential angle between the magnetic pole centers of the first and second rotor cores 121 and 122 that are arranged in the axial direction.

Generally, in embedded permanent magnet rotary electric machines, if the stator windings are concentrated windings, then harmonics are larger and torque ripples are more likely to increase than when a stator winding that is made of distributed windings is used. Harmonics are particularly large if there are eight poles and twelve slots.

In this embedded permanent magnet rotary electric machine 101, because the first and second rotor cores 121 and 122 are arranged coaxially in the axial direction such that magnetic pole centers are offset in a circumferential direction, that is, a step skew is applied, a shift arises in the phase of torque ripples that are generated in the axial direction, enabling the torque ripples to be reduced.

In eight-pole, twelve-slot motors, theoretically, if 1f is a period in which the motor makes one revolution electrically, then large torque ripples arise in a 6f component. Because of that, the step skew is applied so as to set a phase difference of 30 degrees electrically. Now, in the case of an eight-pole motor, 30 electrical degrees corresponds to 7.5 mechanical degrees. However, because the permanent magnets 16 are embedded in the first and second rotor cores 121 and 122, magnetic leakage flux arises that flows axially through core portions of the first and second rotor cores 121 and 122 that are positioned on an outer circumferential side of the permanent magnets 16, making the phase shift in torque ripples that forms in the axial direction different than the theoretical 30 degrees.

Now, a relationship between the step skew angle (electrical degrees) and torque ripples is shown in FIG. 20.

From FIG. 20, torque ripples become gradually smaller as the step skew angle increases from 28 degrees, and torque ripples are further reduced when the step skew angle is greater than or equal to 30 degrees (mechanical angle: 7.5 degrees). Then, when the step skew angle exceeds 43 degrees, reductions in torque ripples become slow, and when the step skew angle exceeds 48 degrees, there is hardly any reduction in torque ripples.

Since increasing torque ripples leads to decreases in output, it is desirable to set the step skew angle to greater than or equal to 30 electrical degrees and less than or equal to 48 degrees from the viewpoint of reducing torque ripples and suppressing decreases in output. Here, a case in which there are eight poles and twelve slots has been explained, but it has also been possible to confirm that similar or identical effects can also be achieved in three-phase motors in which the number of slots per phase per pole in the motor is one half or one quarter.

Embodiment 5

Figure 21:
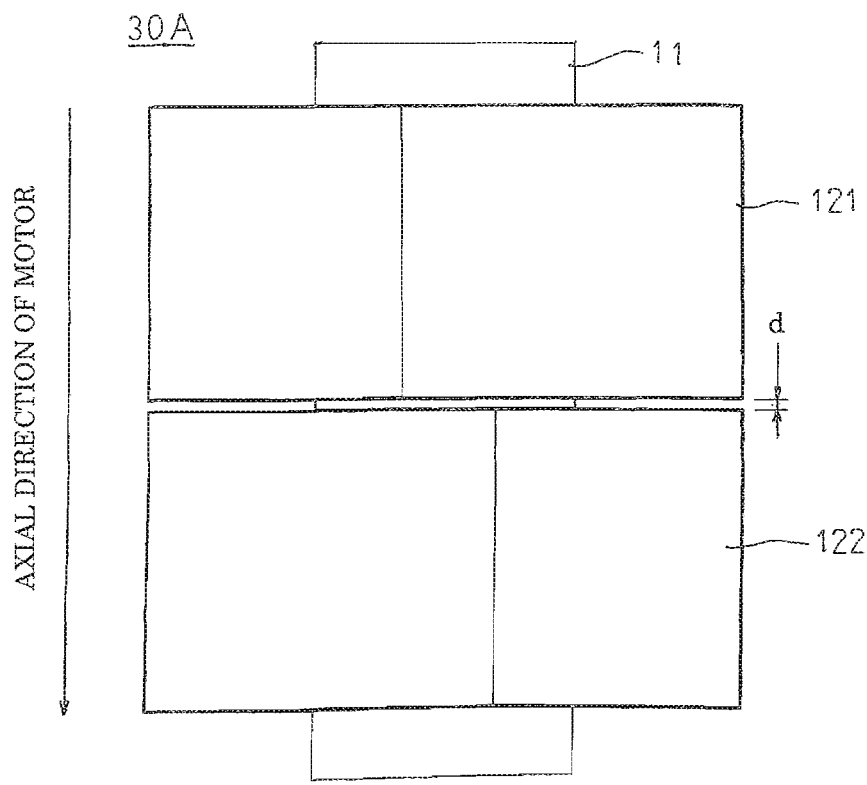
FIG. 21 is a side elevation that shows a rotor core in an embedded permanent magnet rotary electric machine according to Embodiment 5 of the present invention.

FIG. 21 is a side elevation that shows a rotor core in an embedded permanent magnet rotary electric machine according to Embodiment 5 of the present invention.

In FIG. 21, first and second rotor cores 121 and 122 are disposed coaxially such that magnetic pole centers are offset in a circumferential direction so as to ensure a gap d in an axial direction.

Moreover, the rest of the configuration is formed in a similar or identical manner to that of Embodiment 4 above.

In the rotor 30 according to Embodiment 4 above, because the first and second rotor cores 121 and 122 are arranged so as to contact each other in the axial direction, magnetic leakage flux arises that flows axially through core portions of the first and second rotor cores 121 and 122 that are positioned on an outer circumferential side of the permanent magnets 16, leading to decreases in output.

In the rotor 30A according to Embodiment 5, a gap d is ensured between the first and second rotor cores 121 and 122 that are arranged so as to line up in the axial direction. The amount of magnetic leakage flux that flows axially through portions of the first and second rotor cores 121 and 122 that are positioned on an outer circumferential side of the permanent magnets 16 is thereby reduced, enabling the step skew angle for reducing torque ripples to be reduced. Output decreases when the step skew angle is increased. Consequently, according to Embodiment 5, output can be increased compared to Embodiment 4 above.

Now, it is possible to improve output by reducing the magnetic leakage flux in the magnet magnetic flux if the gap d is set to greater than or equal to the thickness B1 in core portions of the first and second rotor cores 121 and 122 that are positioned on an outer circumferential side of the permanent magnets 16, i.e., at the magnetic pole centers of the bridge portions 20. Thus, if t is the sheet thickness of the electromagnetic steel sheets, it is desirable to set the gap d such that d≥0.4×t because the manufacturable B1 is greater than or equal than 0.4×t.

Embodiment 6

Figure 22:
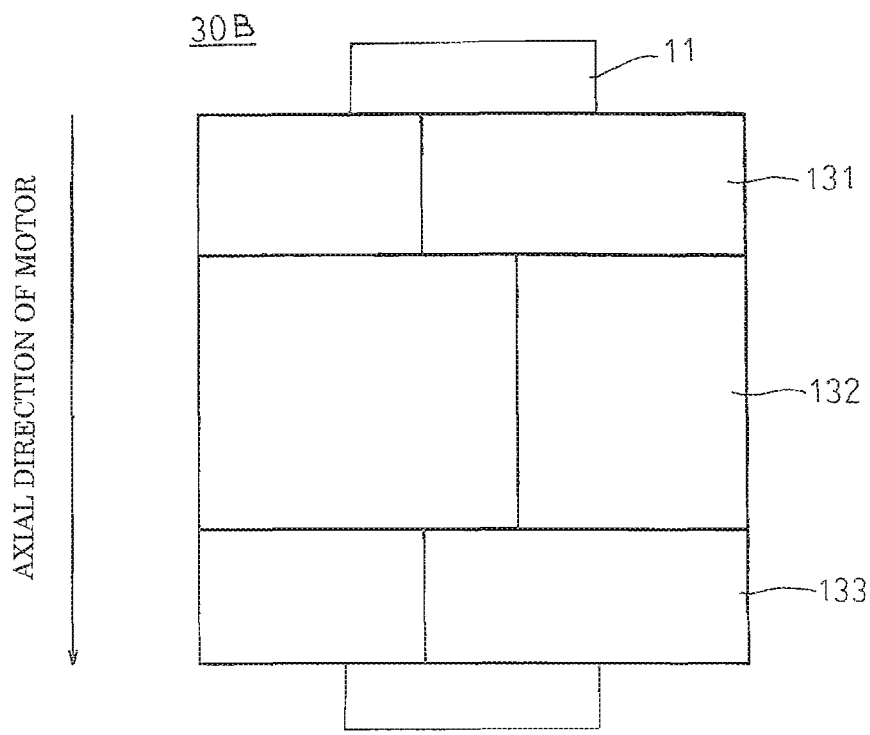
FIG. 22 is a side elevation that shows a rotor core in an embedded permanent magnet rotary electric machine according to Embodiment 6 of the present invention.

FIG. 22 is a side elevation that shows a rotor core in an embedded permanent magnet rotary electric machine according to Embodiment 6 of the present invention.

In FIG. 22, a rotor core is constituted by first through third rotor cores 131, 132, and 133 that function as core segments. The first and third rotor cores 131 and 133 are configured so as to be identical. The second rotor core 132 is configured in a similar or identical manner to that of the first and third rotor cores 131 and 133 except that an axial length thereof is two times that of the first and third rotor cores 131 and 133. The first and third rotor cores 131 and 133 are arranged in an axial direction so as to be coaxial at opposite ends of the second rotor core 132 so as to be in contact therewith. The circumferential positions of the magnetic pole centers of the first and third rotor cores 131 and 133 are aligned, and the magnetic pole centers of the second rotor core 132 are offset in a circumferential direction from the magnetic pole centers of the first and third rotor cores 131 and 133.

Moreover, the rest of the configuration is formed in a similar or identical manner to that of Embodiment 4 above.

In Embodiment 6, the first and third rotor cores 131 and 133 are configured so as to be identical, and the circumferential positions of the magnetic pole centers thereof are aligned. Furthermore, the axial length of the first and third rotor cores 131 and 133 is half the axial length of the second rotor core 132. The second rotor core 132 is step-skewed relative to the first and third rotor cores 131 and 133. Thrust that acts in the axial direction during rotation of the rotor 30B as a result of the step-skewing is eliminated thereby. Consequently, loads on the bearings of the embedded permanent magnet rotary electric machine are reduced, enabling the occurrence of failure in the hearings to be suppressed.

Embodiment 7

Figure 23:
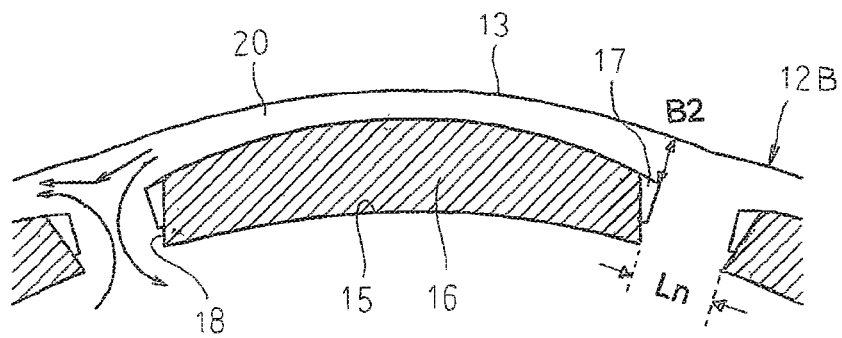
FIG. 23 is a partial enlargement that shows a vicinity of a permanent magnet of a rotor in an embedded permanent magnet rotary electric machine according to Embodiment 7 of the present invention.

FIG. 23 is a partial enlargement that shows a vicinity of a permanent magnet of a rotor in an embedded permanent magnet rotary electric machine according to Embodiment 7 of the present invention.

In FIG. 23, a rotor core 12B is configured such that a distance Ln between facing magnet detent portions 18 is formed so as to be greater than a thickness B2 at circumferential end portions of bridge portions 20.

Moreover, the rest of the configuration is formed in a similar or identical manner to that of Embodiment 1 above.

Magnetic flux that emerges from a first permanent magnet 16 flows through a magnetic path that passes through a core portion of the rotor core 12B on an outer circumferential side between poles toward a neighboring permanent magnet 16, and through a magnetic path that passes through an interpolar core portion of the rotor core 12B and returns to the first permanent magnet 16. The magnitude of the amount of magnetic leakage flux in the magnetic flux that emerges from the permanent magnets 16 is determined by the thickness B2 at the circumferential end portions of the bridge portions 20. Consequently, the amount of magnetic leakage flux does not change even if Ln>B2. If Ln is increased, the mechanical strength of the bridge portions 20 also increases so as to be able to withstand high-speed rotation.

According to Embodiment 7, because Ln is greater than B2, resistance to centrifugal forces can be increased without increasing the magnetic leakage flux.

Moreover, in each of the above embodiments, a single long permanent magnet is housed in each of the magnet housing apertures, but a plurality of short permanent magnets may be housed in each of the magnet housing apertures so as to line up in a single column.

EXPLANATION OF NUMBERING 1, 1A STATOR; 9 AIR GAP; 10, 10A, 10B, 30, 30A, 30B ROTOR; 11 ROTATING SHAFT; 12, 12A, 12B ROTOR CORE; 13 CIRCULAR ARC-SHAPED CURVED SURFACE; 14 CYLINDRICAL SURFACE; 15, 15A MAGNET HOUSING APERTURE; 16, 16A PERMANENT MAGNET; 17 AIR GAP PORTION; 20 BRIDGE PORTION; 21 END PLATE; 121 FIRST ROTOR CORE (CORE SEGMENT); 122 SECOND ROTOR CORE (CORE SEGMENT); 131 FIRST ROTOR CORE (CORE SEGMENT); 132 SECOND ROTOR CORE (CORE SEGMENT); 131 THIRD ROTOR CORE (CORE SEGMENT); d GAP.

The invention claimed is:

1. An embedded permanent magnet rotary electric machine comprising:
   an annular stator; and
   a rotor that is disposed coaxially inside said stator so as to have an air gap interposed,
   wherein:
   said rotor comprises:
      a rotor core that has an external shape in which a plurality of circular arc-shaped curved surfaces that are convex radially outward are arranged circumferentially, and in which magnet housing apertures are formed so as to pass axially through an inner radial side of each of said circular arc-shaped curved surfaces;
      a rotating shaft that is inserted into a central axial position of said rotor core, and that holds said rotor core; and
      permanent magnets that are each produced into a rod-shaped body in which a radially outer side of a cross section that is perpendicular to a longitudinal direction is a circular arc that is convex radially outward, and in which two circumferential side surfaces are flat surfaces that are parallel to a plane that includes a magnetic pole center, said permanent magnets being housed in each of said magnet housing apertures;
   R1>R2>R3 is satisfied, where R1 is a radius of curvature of a cylindrical surface that contacts said circular arc-shaped curved surfaces that are arranged circumferentially, R2 is a radius of curvature of said circular arc-shaped curved surfaces, and R3 is a radius of curvature of an upper surface of said permanent magnets;
   said magnet housing apertures comprise air gap portions in which radially outer portions of two circumferential side portions are expanded circumferentially outward; surfaces that are parallel to a plane that includes said magnetic pole center that contact said two circumferential side surfaces of said permanent magnets are disposed on radially inner portions of said two circumferential side portions of said magnet housing apertures;
   B2>B1 is satisfied, where B1 is a thickness of a core portion of said rotor core between said circular arc-shaped curved surfaces and said magnet housing apertures at said magnetic pole center, and B2 is a thickness of a circumferential end portion of said core portion; and
   a distance between circumferentially adjacent air gap portions and a distance between circumferentially adjacent surfaces among said surfaces that are parallel to said plane that includes said magnetic pole center that contact said two circumferential side surfaces of said permanent magnets are equal.

2. The embedded permanent magnet rotary electric machine according to claim 1, wherein Wm+0.05 mm≤Ws≤Wm+0.1 mm is satisfied, where Wm is a circumferential width between radially inner end portions of two circumferential side portions of said permanent magnets, and Ws is a circumferential width between said radially inner end portions of said two circumferential side portions of said magnet housing apertures.

3. The embedded permanent magnet rotary electric machine according to claim 2, wherein said permanent magnets are formed so as to have a cross-sectional shape perpendicular to a longitudinal direction in which a radially outer side is a circular arc that is convex radially outward and a radially inner side is a circular arc that is convex radially outward, R1>R4>R2>R3 being satisfied, where R4 is a radius of curvature of a lower surface of said permanent magnets.

4. The embedded permanent magnet rotary electric machine according to claim 2, wherein a lower surface of said permanent magnets is formed into a flat surface that is perpendicular to a direction of a radius that passes through a circumferentially central portion of said permanent magnets.

5. The embedded permanent magnet rotary electric machine according to claim 2, wherein a circumferential thickness of said rotor core between magnet housing apertures that are adjacent to each other in a circumferential direction is thicker than a radial thickness of core portions of said rotor core on an outer circumferential side of two circumferential side portions of said permanent magnets.

6. The embedded permanent magnet rotary electric machine according to claim 2, wherein said rotor core is configured such that n core segments are arranged axially, where n is an integer that is greater than or equal to two, and magnetic pole centers of core segments that are axially adjacent are offset in a circumferential direction.

7. The embedded permanent magnet rotary electric machine according to claim 1, wherein said permanent magnets are formed so as to have a cross-sectional shape perpendicular to a longitudinal direction in which a radially outer side is a circular arc that is convex radially outward and a radially inner side is a circular arc that is convex radially outward, R1>R4>R2>R3 being satisfied, where R4 is a radius of curvature of a lower surface of said permanent magnets.

8. The embedded permanent magnet rotary electric machine according to claim 1, wherein a lower surface of said permanent magnets is formed into a flat surface that is perpendicular to a direction of a radius that passes through a circumferentially central portion of said permanent magnets.

9. The embedded permanent magnet rotary electric machine according to claim 1, wherein a circumferential thickness of said rotor core between magnet housing apertures that are adjacent to each other in a circumferential direction is thicker than a radial thickness of core portions of said rotor core on an outer circumferential side of two circumferential side portions of said permanent magnets.

10. The embedded permanent magnet rotary electric machine according to claim 1, wherein said rotor core is configured such that n core segments are arranged axially, where n is an integer that is greater than or equal to two, and magnetic pole centers of core segments that are axially adjacent are offset in a circumferential direction.

11. The embedded permanent magnet rotary electric machine according to claim 10, wherein said embedded permanent magnet rotary electric machine is a three-phase embedded permanent magnet motor,
said stator comprises:
an annular back yoke;
teeth each that protrude radially inward from said back toke so as to be arranged; and
a stator winding that is mounted to slots that are formed by said back yoke and adjacent teeth;
a number of slots per phase per pole is one half or one quarter; and
an angle of offset in said circumferential direction between said magnetic pole centers of said core segments that are axially adjacent is greater than or equal 30 electrical degrees and less than or equal 48 electrical degrees.

12. The embedded permanent magnet rotary electric machine according to claim 11, wherein a gap is disposed between said core segments that are axially adjacent.

13. The embedded permanent magnet rotary electric machine according to claim 10, wherein a gap is disposed between said core segments that are axially adjacent.

14. The embedded permanent magnet rotary electric machine according to claim 13, wherein $B1 \leq d$ is satisfied, where d is said gap.

15. An embedded permanent magnet rotary electric machine comprising:
an annular stator; and
a rotor that is disposed coaxially inside said stator so as to have an air gap interposed,
wherein:
said rotor comprises:
a rotor core that has an external shape in which a plurality of circular arc-shaped curved surfaces that are convex radially outward are arranged circumferentially, and in which magnet housing apertures are formed so as to pass axially through an inner radial side of each of said circular arc-shaped curved surfaces;
a rotating shaft that is inserted into a central axial position of said rotor core, and that holds said rotor core; and
permanent magnets that are each produced into a rod-shaped body in which a radially outer side of a cross section that is perpendicular to a longitudinal direction is a circular arc that is convex radially outward, and in which two circumferential side surfaces are flat surfaces that are parallel to a plane that includes a magnetic pole center, said permanent magnets being housed in each of said magnet housing apertures;

$R1>R2>R3$ is satisfied, where R1 is a radius of curvature of a cylindrical surface that contacts said circular arc-shaped curved surfaces that are arranged circumferentially, R2 is a radius of curvature of said circular arc-shaped curved surfaces, and R3 is a radius of curvature of an upper surface of said permanent magnets;
said magnet housing apertures comprise air gap portions in which radially outer portions of two circumferential side portions are expanded circumferentially outward;
surfaces that are parallel to a plane that includes said magnetic pole center that contact said two circumferential side surfaces of said permanent magnets are disposed on radially inner portions of said two circumferential side portions of said magnet housing apertures;
$B2>B1$ is satisfied, where B1 is a thickness of a core portion of said rotor core between said circular arc-shaped curved surfaces and said magnet housing apertures at said magnetic pole center, and B2 is a thickness of a circumferential end portion of said core portion;
end plates are disposed so as to contact two axial end surfaces of said rotor core and so as to cover at least a portion of said permanent magnets when viewed from an axial direction; and
a radial position of outer circumferential edges of said end plates is greater than or equal to a radial position of a point that is half of a thickness of said permanent magnets at said magnetic pole center, and is less than or equal to a radial position of a point of intersection between said upper surface and side surface of said permanent magnets.

16. The embedded permanent magnet rotary electric machine according to claim 15, wherein said rotor core is configured such that n core segments are arranged axially, where n is an integer that is greater than or equal to two, and magnetic pole centers of core segments that are axially adjacent are offset in a circumferential direction.

17. The embedded permanent magnet rotary electric machine according to claim 16, wherein said embedded permanent magnet rotary electric machine is a three-phase embedded permanent magnet motor,
said stator comprises:
an annular back yoke;
teeth each that protrude radially inward from said back toke so as to be arranged; and
a stator winding that is mounted to slots that are formed by said back yoke and adjacent teeth;
a number of slots per phase per pole is one half or one quarter; and
an angle of offset in said circumferential direction between said magnetic pole centers of said core segments that are axially adjacent is greater than or equal 30 electrical degrees and less than or equal 48 electrical degrees.

18. The embedded permanent magnet rotary electric machine according to claim 17, wherein a gap is disposed between said core segments that are axially adjacent.

19. The embedded permanent magnet rotary electric machine according to claim 16, wherein a gap is disposed between said core segments that are axially adjacent.

20. The embedded permanent magnet rotary electric machine according to claim 19, wherein $B1 \leq d$ is satisfied, where d is said gap.

* * * * *